Dec. 15, 1925.  R. P. MARTIN  1,565,381
WINDSHIELD RAIN SHIELD
Filed April 19, 1924
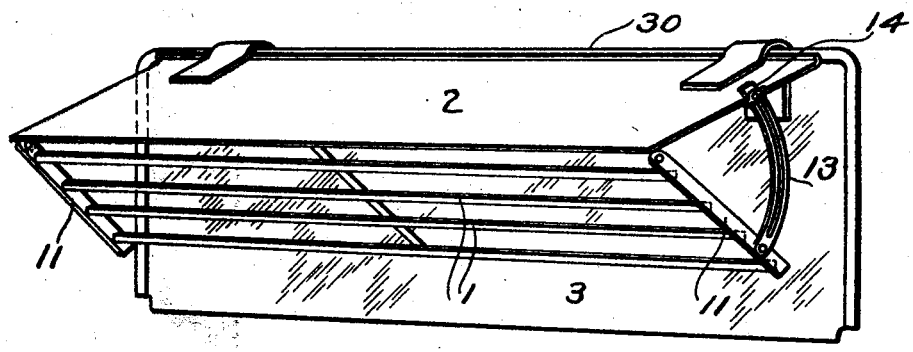
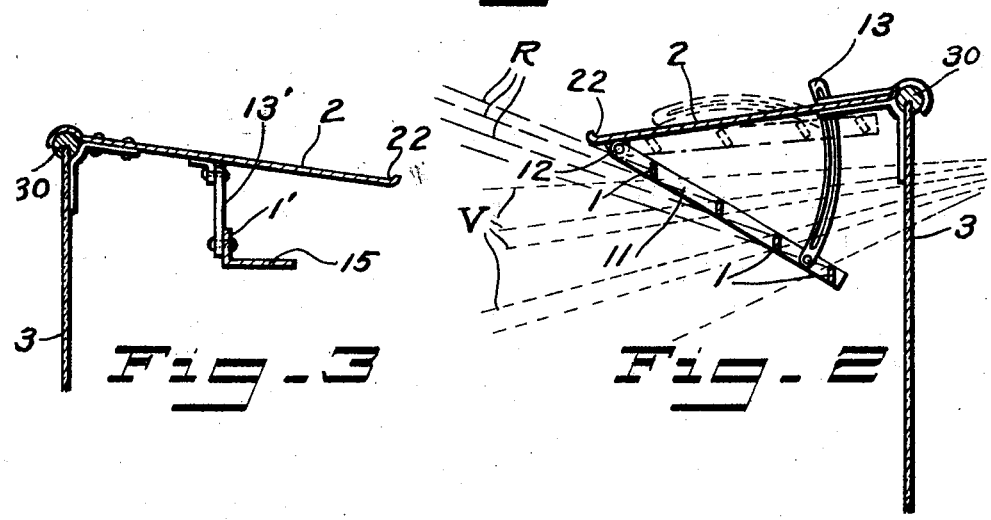
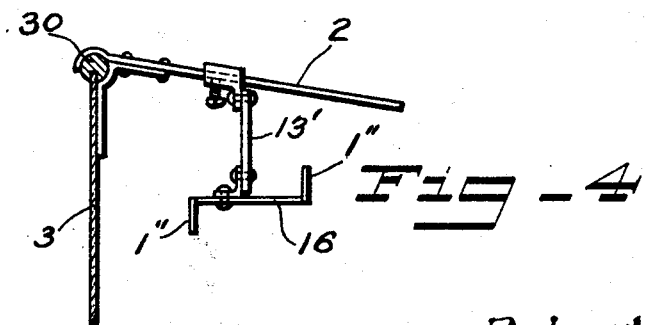
Inventor
Robert P. Martin
By H.L. & C.L. Reynolds
Attorneys Patented Dec. 15, 1925.

1,565,381

UNITED STATES PATENT OFFICE.

ROBERT P. MARTIN, OF SEATTLE, WASHINGTON, ASSIGNOR, BY DIRECT AND MESNE ASSIGNMENTS, OF ONE-FOURTH TO HUGH MULLIGAN, FORTY-SEVEN ONE-HUNDREDTHS TO DANIEL MULLIGAN, ONE-TENTH TO CLARENCE M. TUCK, AND THREE ONE-HUNDREDTHS TO EUGENE DORAN, ALL OF SEATTLE, WASHINGTON.

WINDSHIELD RAIN SHIELD.

Application filed April 19, 1924. Serial No. 707,605.

*To all whom it may concern:*

Be it known that I, ROBERT P. MARTIN, a citizen of the United States of America, and resident of the city of Seattle, in the county of King and State of Washington, have invented certain new and useful Improvements in Windshield Rain Shields, of which the following is a specification.

My invention relates to a rain shield which is particularly intended for employment upon moving vehicles to protect the windshield thereof from the rain, to the end that the driver's vision is not obscured by rain falling upon or running down over the surface of the windshield.

It is an object of my invention to provide means which themselves are of but slight vertical extent and which will therefore, but little obscure the driver's vision, but which are so placed with relation to each other and to the windshield, and with relation to the angle of impact of rain drops with the moving vehicle, that they will intercept all rain drops which would otherwise strike the windshield and will cause them to be deflected or drained downward without permitting them to strike the windshield at the point where they would obstruct the driver's vision.

A further object is the provision of a rain shield of the type described, in association with a visor or sun shade, and particularly the provision of a rain shield which can be adjusted both with relation to the individual members of the rain shield and with relation to the visor.

A further object is the provision of a simple, cheap, and effective rain shield, and one which may be moved into inoperative position to be out of sight during clear weather.

My invention comprises those novel parts and combinations thereof which are shown in the accompanying drawings, described in the specification and particularly defined by the claims terminating the same.

In the accompanying drawings I have shown my invention in the form which is now preferred by me.

Figure 1 is a perspective view and Figure 2 a transverse section of my preferred form of rain shield, shown applied to a windshield.

Figure 3 is a section through a modified form of rain shield.

Figure 4 is an end elevation of a further modification, the windshield being shown in section.

Essentially my invention consists in the employment of one or more transversely extending members having but slight vertical extent, that is to say, extending in a vertical direction, as seen from the driver's seat, but a slight distance, to the end that the driver's vision is the least interrupted, and so positioned that rain drops moving along a line which is the component of the forces acting upon the rain falling by gravity or driven by the wind, as modified by the movement of the car itself, will be intercepted and prevented from striking that portion of the windshield through which the driver must look.

Commonly such a rain shield would be employed in association with a visor 2 suitably supported from the top 30 of the frame about the windshield 3. Such a visor would intercept rain drops which might strike the uppermost portions of the windshield 3, but could not extend down far enough to intercept all rain drops which would interfere with the driver's vision, without itself seriously interfering therewith, particularly if it is not made of a transparent material such as glass. As I prefer to form the visor 2, it is made of metal, hence while it will serve as a sun visor or shade, it may not extend downward to a point where it will interfere with the driver's vision, and consequently may not extend down sufficiently far to intercept all rain drops which would interefere with the driver's vision, for when the car is in motion the angle of impact of the rain drops will be very low, perhaps 15˚ or 20° from the horizontal.

In order to intercept the rain drops which would fall on the lower portions of the windshield, therefore, I provide transverse members which in the preferred form are shown as strips 1. These strips are supported in advance of the windshield 3 and are positioned one in front of another, the forward strips each being placed somewhat above the strips in the rear thereof, to the end that a line drawn downwardly and rearwardly, from the bottom edge of a forward strip 1, at the angle of impact with falling rain, will strike below the upper edge of the next rearward strip 1. This is indicated by the lines R in Figure 2. By thus positioning the members 1, each will intercept its share of the rain drops and each will protect a surface of the windshield not protected by the other strips, but overlapping the area protected thereby, to such an extent that rain will not pass through the series of strips but will be intercepted thereby and will drop therefrom without striking the windshield. By spacing the strips 1 in the manner described, the driver is left an area between them of considerable extent, particularly as his vision is directed forwardly and downwardly, along the lines V in Figure 2, through which area he may observe the road ahead. The strips 1, which may be of metal or which may be of a transparent material, having but slight effective vertical extent, and being well in advance of the driver's eyes, only slightly intercept the vision of the driver.

In the preferred form of the invention, shown in Figures 1 and 2, the strips 1 are directly supported from side bars 11, which normally extend downwardly and rearwardly from the forward edge of the visor 2, and which are pivoted to this forward edge, as indicated at 12. By thus supporting the strips 1 and side bars 11, the elevation of the strips 1 relative to each other may be adjusted, as for example by a slotted link 13 connecting the swinging ends of the side bars 11 with the visor 2, and a bolt and clamping nut 14 serving to maintain the links 13 in adjusted position relative to the visor. When it is not raining, the rain shield may thus be drawn up under the visor and out of the way, as has been indicated in dot-and-dash lines in Figure 2.

It is important for the success of this device that the forward or rain-impacting or receiving surface of the bars 1 which form the grid, should be angularly positioned in such manner that the spatter of rain striking thereon will be downwardly rather than upwardly. It may with reasonable truthfulness be said that the direction of movement of the rain relative to the car will never be horizontally. It may under extreme conditions be at as flat an angle as 10° or 15° to the horizontal. If, therefore, the front or rain-impacting surfaces of the grid bars 1 be in horizontal planes, there will be an angular direction of 10° to 15° which will insure downward deflection of the spattered rain. This will be enough to insure such spattered rain from one bar being caught by the bar next rearward of and below, thus preventing its getting on the windshield. If the angle of the forward rain impacting faces be increased the above action is intensified. In addition the air will also be deflected downwardly, thus adding to the protective effect in the same way side or wing shields protect the driver of an open car.

It may be desirable, in order to increase the effective vertical extent of the rain shield members without increasing their vertical extent in the line or vision, to provide horizontally extending portions on each, which will increase the angle from the forward edge of the visor, which is intercepted thereby. To this end I have shown the vertical strip 1' in Figure 3 as provided with a substantially horizontal shelf 15. Thus, rain falling at the normal angle of impact, which would ordinarily pass below the edge of the vertical strip 1', will be caught on the shelf 15 and thus be prevented from striking the windshield 3. The shelf 15 cannot be of too great extent, however, as otherwise rain will strike upon it and glance therefrom over the upper edge of the strip 1' and will strike the windshield 3. In order to move this form of rain shield out of the way or to adjust it vertically, I have shown it as pivoted on a link 13' pivoted to the visor and to the vertical strip 1'. Any suitable catch may be employed to hold it in elevated position.

A further modification is shown in Figure 4, wherein the strips 1'' are supported one in advance of the other and at different elevations, being supported upon longitudinal bars 16 which are not solid but which merely space the two bars 1'' longitudinally, thus permitting the driver to look between the strips 1'', which are at different elevations.

It will be understood that various drains and rain channels as, for example, the gutter 22, as shown in Figures 2 and 3, particularly, may be employed to carry away rain either from the visor or from the individual rain shield members. It will be evident also that while it is preferable to employ a visor 2, the particular form thereof is immaterial.

What I claim as my invention is:

1. A rain protector for automobile windshields comprising a grid of bars extending horizontally lengthwise of the windshield and having forward rain-impacting surfaces positioned at an angle which deflects the spatter of rain received thereon downwardly, said grid bars being separated and disposed in a a plane which inclines from its forward edge downwardly towards the rear.

2. A rain protector for automobile windshields comprising a grid of bars extending horizontally lengthwise of the windshield and having forward rain-impacting surfaces positioned at an angle which deflects the spatter of rain received thereon downwardly, said grid bars being separated and disposed in a plane which inclines from its forward edge downwardly towards the rear, and a visor extending from the windshield forwardly to cover said grid.

3. A rain protector for automobile windshields comprising a grid of bars extending horizontally lengthwise of the windshield and having forward rain-impacting surfaces positioned at an angle which deflects the spatter of rain received thereon downwardly, said grid bars being separated and disposed in a plane which inclines from its forward edge downwardly towards the rear, and means for swinging said grid out of the way when not needed.

4. A rain protector for automobile windshields comprising a grid of bars extending horizontally lengthwise of the windshield and having forward rain-impacting surfaces positioned at an angle which deflects the spatter of rain received thereon downwardly, said grid bars being separated and disposed in a plane which inclines from its forward edge downwardly towards the rear, a visor extending from the windshield forwardly to cover said grid, said grid being hinged by its forward edge to the visor and means for adjustably supporting its rear edge from the visor to permit its being swung up and supported against the under face of the visor.

5. A rain protector for automobile windshields comprising a visor extending forwardly from the upper edge of the windshield and a grid of bars extending lengthwise of and below the visor and lying in an inclined plane extending from the visor backwardly and downwardly towards the windshield.

6. A rain protector for windshields comprising a forwardly extending visor, a grid of individually separated rain intercepting bars extending lengthwise of the windshield, the forward edge of the grid being carried from the visor and the plane of the grid extending rearwardly and downwardly toward the windshield.

7. A rain protector for windshields comprising a forwardly extending visor, a grid of individually separated rain intercepting bars extending lengthwise of the windshield, the forward edge of the grid being carried from the visor and the plane of the grid extending rearwardly and downwardly toward the windshield, and means for adjusting the angle of the plane of the grid.

Signed at Seattle, King County, Washington, this 12th day of April 1924.

ROBERT P. MARTIN.